V. SLAVÍČEK.
APPARATUS FOR THE FRACTIONAL DISTILLATION, CONDENSATION, AND RECTIFICATION OF LIQUIDS.
APPLICATION FILED DEC. 30, 1902.
926,216.
Patented June 29, 1909.
3 SHEETS—SHEET 1.
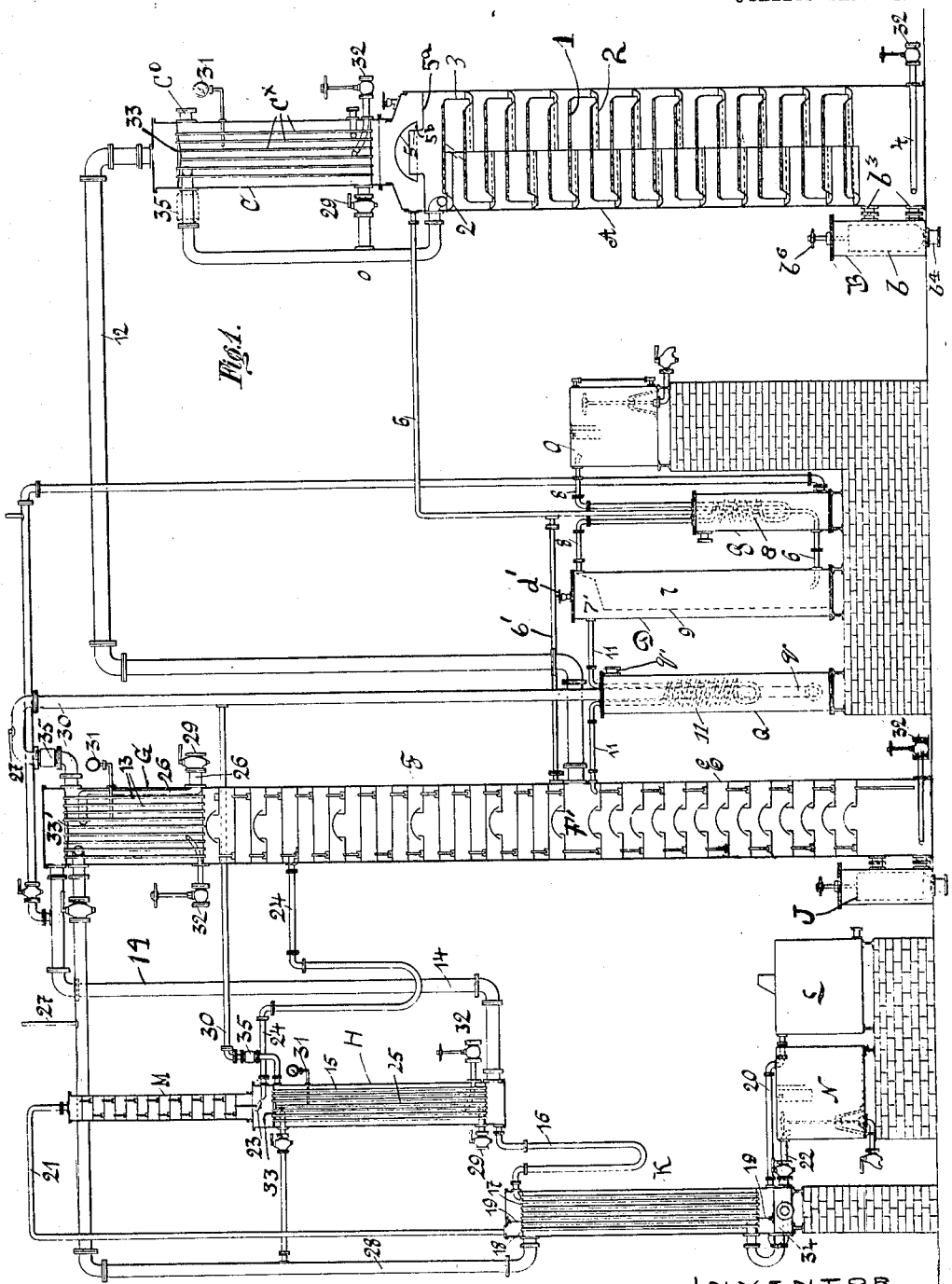

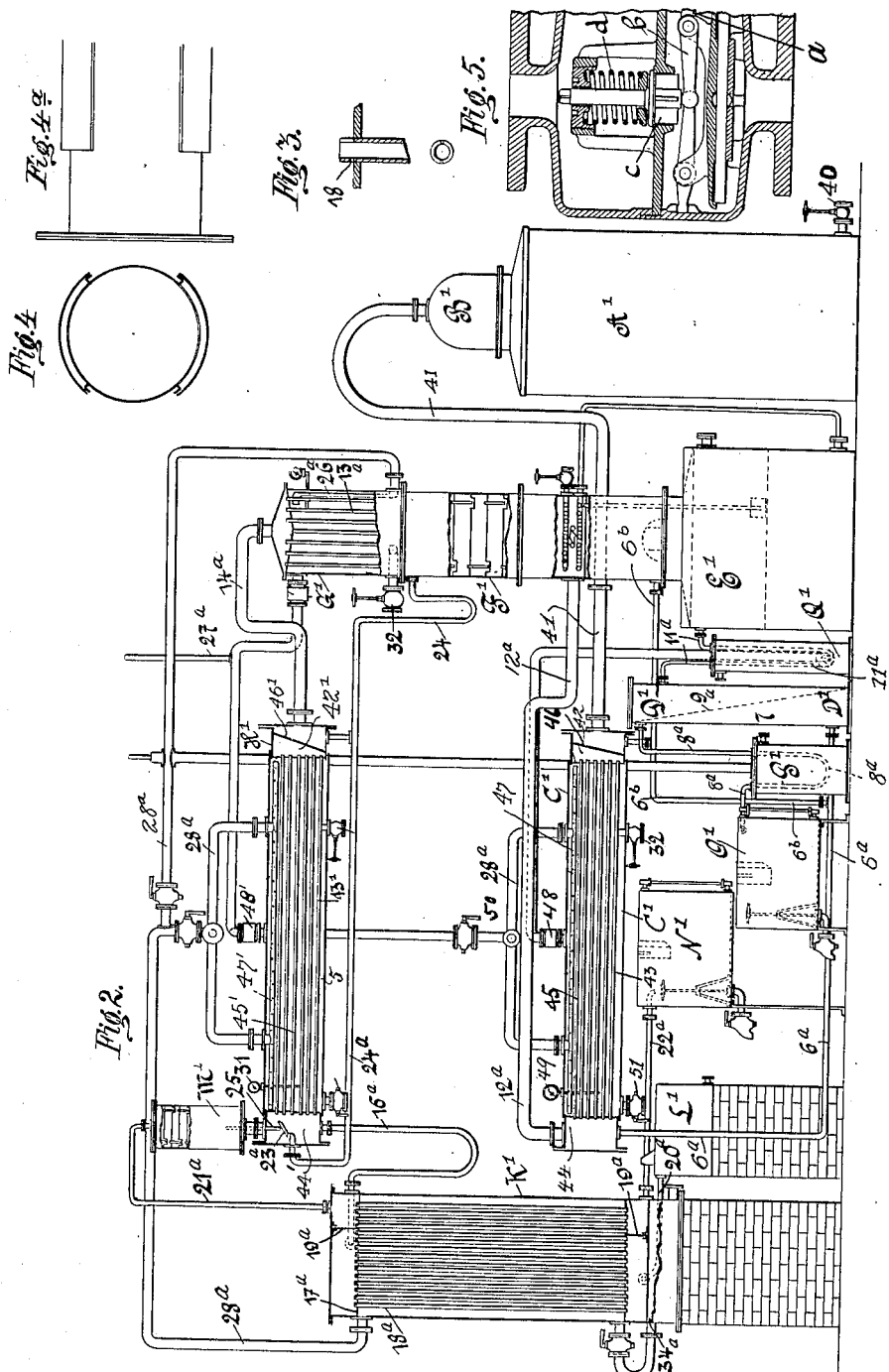

V. SLAVÍČEK.
APPARATUS FOR THE FRACTIONAL DISTILLATION, CONDENSATION, AND RECTIFICATION OF LIQUIDS.
APPLICATION FILED DEC. 30, 1902.
926,216.
Patented June 29, 1909.
3 SHEETS—SHEET 3.
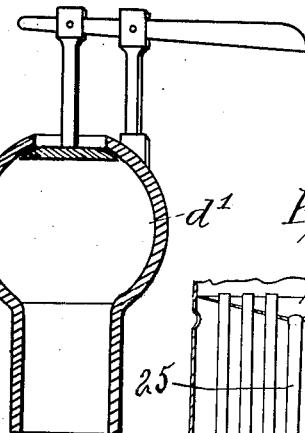
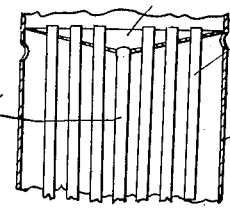
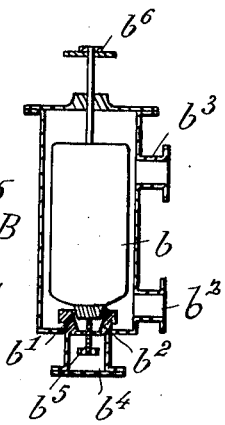
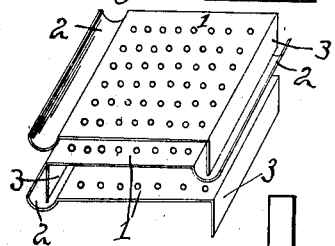
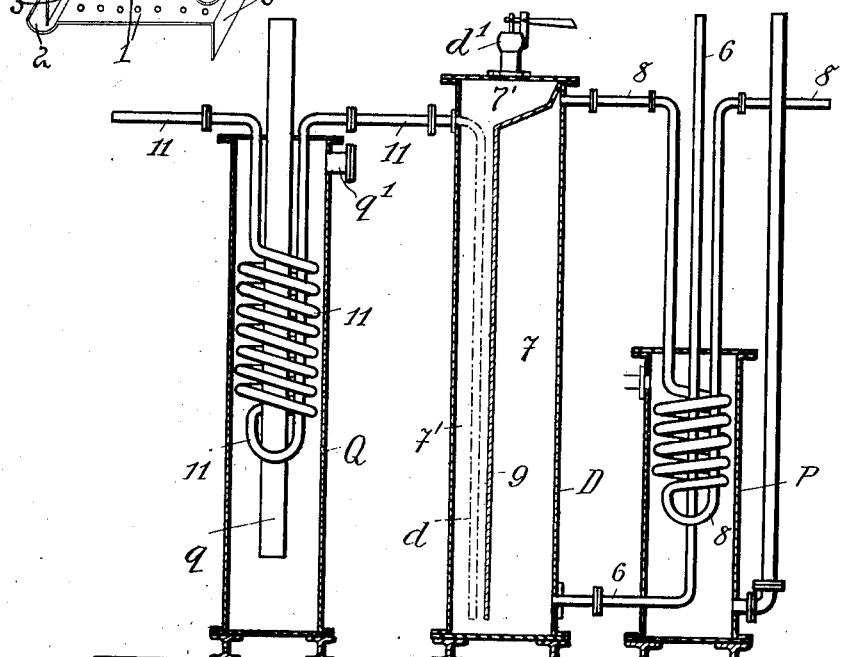

UNITED STATES PATENT OFFICE.

VICTOR SLAVÍČEK, OF VIENNA, AUSTRIA-HUNGARY.

APPARATUS FOR THE FRACTIONAL DISTILLATION, CONDENSATION, AND RECTIFICATION OF LIQUIDS.

No. 926,216.        Specification of Letters Patent.        Patented June 29, 1909.

Application filed December 30, 1902. Serial No. 137,199.

*To all whom it may concern:*

Be it known that I, VICTOR SLAVÍČEK, a subject of the Emperor of Austria, and residing at Vienna, Austria-Hungary, have invented certain new and useful Improvements in Apparatus for the Fractional Distillation, Condensation, and Rectification of Liquids, of which the following is a specification.

My invention relates to distilling and rectifying apparatus by means of which pure distillates may be obtained direct from the mash by a single distilling operation.

The invention consists in certain novel arrangements of parts as will be more fully described in the following specification, reference being had to the accompanying drawings illustrating the invention in which—

Figure 1 is a sectional elevation of a continuous working column apparatus embodying my invention and Fig. 1$^a$ is a perspective detail view of some of the plates in column A. Fig. 2 is a similar view of a modification showing a reconstruction of a Pistorius apparatus. Figs. 3, 4, 4$^a$ show details to be hereinafter referred to. Fig. 5 is a vertical section taken through the temperature valve. Figs. 6, 7 and 8 show further details of the invention. Fig. 9 is a detailed sectional view on a larger scale of the upper end of the condenser H.

Referring more particularly to Fig. 1: The mash coming from the mash-pump or other source of supply (not shown) passes into the condenser C at C° where it acts as cooling agent and is itself heated. From said condenser C the heated mash runs through the pipe $o$ into the distilling column A, which column has partitions 1, each being provided with a channel 2 having a semi-circular or curved bottom and a flange 3 extending downward into the channel 2 of the next lower partition 1 as shown in detail in Fig. 1$^a$. The level surface of each partition 1 is provided with fine perforations. The hot mash coming in through tube $o$ first fills the channel 2 of the uppermost partition 1, then distributes itself uniformly over the surface of said partition, the perforations being so small that the mash will not pass through. From the uppermost partition the mash flows over the depending flange 3 into the channel 2 of the following partition 1, fills up said channel, distributes itself over the surface of the second partition, and so on to the succeeding partitions or shelves.

At the bottom of the column A, steam is supplied through a tube 4 and heats the mash at the bottom of the column A and upon the lowermost partitions 1. The spirituous vapors then ascend and by passing through the fine perforations of the partitions 1 they are finely distributed and are condensed by penetrating the layer of mash upon each partition, the products of condensation, remaining for the most part in the mash which is at the same time caused to boil, the uncondensed vapors rising through all partitions 1 until they reach the dome or cap 5, by passing through the central opening of the plate 5$^a$, which is provided with an upright inner cylindrical flange 5$^b$ around said opening. From the dome or cap 5 the gases are conducted to the condenser C.

The mash deprived of all its volatile constituents or spirits passes off, at the bottom of the column A, as a residual liquid into the regulator B. The regulator B, which is more clearly shown in cross-section in Fig. 6 consists of a closed vessel which is connected with the column A and in which is arranged a float $b$ carrying on its lower end a cone-valve $b'$ fitting into a corresponding valve-seat $b^2$ arranged in the bottom of the casing B. Said float has the function to maintain a predetermined level of mash in the chamber which forms the lower portion of the column A, the float being raised when the mash entering through connecting tubes $b^3$, reaches a certain level, so that the valve in the bottom of the regulator opens and permits the mash to flow off through the passage $b^4$; whereafter the float sinks and the valve is closed. $b^5$ and $b^6$ indicate guides for the stem of the float.

The condenser C is provided with very small tubes C$^\times$ inserted between tube plates and surrounded, as above indicated, by the mash coming from the mash pump, or by any other cooling agent. In these tubes C$^\times$ spirituous vapors coming from the dome 5 are cooled and condensed. The condensed spirits run to the plate 5$^a$, filling up the space above said plate and are conducted by means of a pipe 6, passing through a cooler P, to the fusel-oil separator D, Fig. 7. This fusel-oil separator D is divided in two chambers 7 and 7' by means of a partition 9 extending downward nearly to the bottom. An air valve $d'$, Figs. 1, 7 and 8, is arranged on the top of the chamber 7'. In the larger chamber 7 the fusel-oils rise, in consequence of their lower specific gravity to the top and pass through pipe 8 into the collector O (see Fig. 1). The purified condensates pass below the partitions 9 into the chamber 7' and flow through pipe 11 onto the upper shelf of the low wines portion E of the column E—F for the purpose of being deprived of spirit. The pipe 11 passes in coils through a heater Q, Figs. 1 and 7, which serves to heat the condensates anew. Tube $q$ advantageously connected with pipe 30 and illustrated in Fig. 1, serves to receive water from the condenser $g$ and convey it into the heater, a tube $q'$ leading the heating medium away. From the lowermost partition of the rectifying portion, the low wine is conducted through pipe 6' to the fusel-oil separator D.

The uncondensed vapors in the condenser C pass through the pipe 12, into the space F' between column parts E and F, where they become mixed with the vapors from the condensates in the portion E and are thereby heated. They then pass upward through the shelves of the portion F to the condensing apparatus G, rise through the tubes 13 and pass dephlegmated or freed from less volatile constituents through the pipe 14 to the condenser H. This condenser has two tube plates forming a middle chamber and is connected by small tubes 15 which are surrounded by a cooling medium or liquid contained in said middle chamber. The upper partition 33 is slightly funnel-shaped (see Fig. 9). By proper cooling, the portion of the vapors next easily condensed, is condensed in the small tubes 15, passes as condensate or extra fine spirit through the small tubes 15 of the condenser H and is conducted through the pipe 16 to the common tubular cooler K, where it is delivered on to an upper tube plate 17. The projecting top ends of the cooler tubes 18 are provided with a suitable number of small slots or fine perforations (as shown in the sectional view Fig. 3), in order that the condensate (extra fine spirit) may be distributed uniformly into all the tubes. The number and size of the slots or perforations must be adapted to the quantity of the condensate. The chamber of cooler K below the lower tube plate is divided by one or more partitions 19 into two or more compartments, so that two or more condensates or vapors may be received at the same time. The cooler K may be connected with a final cooler 34 which enables by its great cooling surface considerable further cooling of the condensates falling down in drops from the tubes 18. The cooled condensates (extra fine spirit) run through the pipe 20 into the measuring apparatus L. The condensates free of alcohol pass automatically out of the column E into the regulator J. The vapors which leave the tubes 15 of the condenser H, and which all carry readily volatile vapors (aldehydes) with them, reach the rectifying column M, where the less volatile portions of the vapor (extra fine spirit) for the most part remain behind, while the more volatile portions (aldehyde, first-runnings), which depending upon the use to be made of them, or the temperature, or the number of partitions in the column M, are more or less mixed with the readily condensable portions (spirit), pass through the pipe 21 into the common tubular cooler K, and then through the pipe 22 into the aldehyde collector N or into a second measuring apparatus. Should the aldehyde spirit be required for debasing purposes, the column M is wholly or partly dispensed with, and the mixed aldehyde-spirit-vapors are conducted directly into the cooler K in large quantities.

To enable regulation of the condensate (extra fine spirit) from the column M, a swing-pan 23 operated from the outside is provided, whereby the mixed condensate (extra fine spirit) which forms from the commencement of the distillation in consequence of the strong cooling, is discharged into the pipe 24, which conducts it to the portion F where it is deprived of spirit. Or when the column M is so far heated by the incoming vapors that the less readily condensable portions (first runnings, aldehydes) of the vapors cannot condense in the column, and only the readily condensable portion (extra fine spirit) flows down, the swing-pan is inclined to one side, so that these condensates flow down to the frusto-shaped partition or tube plate 33 of the condenser H and through the central pipe 25 of said condenser H, mix with the other condensates and flow through the pipe 16 to the common cooler K.

The counter-current condenser G is so arranged, that the cooling liquid (water, mash etc.) flowing in from below, is conducted next the wall of the condenser upward to the top partition through the pipe 26, so that the cold liquid sinks by reason of its specific gravity uniformly distributed to the bottom. 27 is an air pipe.

The water leaving the tubular cooler K is thoroughly utilized by being conducted through the pipe 28 into the condensers G and H from above, or conducted from below as already described in reference to the condenser G, and is led either into the condenser C or immediately to the low wines heater Q. The valves 29 are provided for the purpose of emptying or cleaning the condensers.

Temperature regulating valves 35 (Fig. 5) are provided in the pipes 30 or directly at the condensers, coolers etc., for the purpose of regulating automatically the temperature in the interior of the condensers G C, etc. These valves consist of an expansible member or bladder *a* of well known construction, located in the interior of the condenser or the like, or in the valve itself, and filled with a liquid, which boils at a predetermined temperature. *c* is a valve operated by two levers *b*, actuated by the bladder. On the valve *c* is a spiral spring *d*, which at normal temperature holds the valve closed. If, however, the temperature in the condenser rises above the desired height, the liquid in the bladder commences to boil, expands and lifts the levers *b* and valve-cone *c*, whereby hot water can escape from the condenser, cold water rushing in through the pipe 28 to take its place. The thermometers 31 are provided for the purpose of admitting of the temperature being checked at any moment.

In order that the water may be heated at the commencement of distillation or heated up during the same, and that normal condensation may not be disturbed, owing to too cold water, steam valves 32 are provided, a pipe leading from them into the interior, so that by admitting steam through these valves, the temperature of the cooling liquid of the condenser C or H or dephlegmator G can be raised as desired.

Should the water employed for cooling cause chemical deposits, mud-holes covered by suitable plates (Figs. 4 and 4ª) must be provided throughout the full length of the condensers C and the like to admit of mud or incrustation being removed.

The modified apparatus represented in Fig. 2 is a reconstruction of a Pistorius apparatus and shows in general the same construction and arrangement of parts as that already described, with the main difference that horizontal condensers are employed. In this apparatus A′ is the known alembic which is employed instead of the distilling apparatus described with reference to Fig. 1. In said alembic only a certain quantity of mash is brought in, distilled and drawn off at intervals, whereafter new mash is brought in. The alembic is provided with a valve 40 serving to introduce steam. The spirituous vapors are conducted from the head B′ of the column A′ through a tube 41 to the horizontal condenser C¹. This horizontal condenser C¹ has two inner partitions creating three chambers 42, 43 and 44. The two end chambers 42 and 44 are connected together by means of small tubes 45, arranged in suitable number, through which tubes pass the vapors to be treated. The chamber 42 in which the vapors enter first, is provided with an inclined sieve-plate 46 or equivalent which serves to distribute the vapors uniformly to all tubes 45. This arrangement is necessary in such horizontal condensers for the reason that the hot vapors have the tendency to rise and would pass through the upper tubes 45 in greater quantity than through the lower tubes when not such a sieve or plate 46 be provided to deflect the vapors downward and distribute them uniformly. The middle chamber 43 of the condenser contains the cooling liquid which enters through a horizontal pipe 47 having perforations for distributing the cooling liquid. The temperature of the cooling liquid is regulated by means of a valve 48 of same construction as the valve 35 described above in the apparatus Fig. 1. The function of this valve is checked by a thermometer 49. 50 is a steam valve which permits of heating the cooling liquid at the commencement of distillation or during the same. The cooling liquid may be drawn off through the valve 51.

In the condenser C¹ the vapors flowing through the very small tubes 45 are purified from water and fusel-oil by appropriate cooling and the condensates are conducted from the chamber 44 through the pipe 6ª going through a cooler P′, to the fusel-oil separator D′ of same construction as that described regarding to Fig. 1, that is to say having a partition 9ª. The condensates are purified in said separator from the fusel-oil which floats to the top and passes through the pipe 8ª into the collector O′, and the purified condensates flow through pipe 11ª to the low wines column E′. As the tube 11ª passes through the heater Q′ the condensates are anew heated before entering into the low wines column E′. From the lowermost partition of the rectifying column F′ the low wine is conducted through pipe 6ᵇ to pipe 6ª and the fusel-oil separator D′.

The vapors in the condenser C′ which have not been condensed pass from chamber 44 through the pipe 12ª into the rectifying column F′, where they become mixed with the vapors from the condensates in the column E′. They then pass through the column F′ to the condensing part or dephlegmator G′, rise through the tubes 13ª of said dephlegmator and pass dephlegmated through the pipe 14ª to a second horizontal condenser H′. The condenser H′ is of same construction as the condenser C′ already described. The vapors are distributed in the chamber 42′ by means of a sieve 46′, pass through the tubes 45′ arranged in the chamber 43′ in which the cooling liquid enters through a tube 47′ and regulating valve 48′. The condensate (extra fine spirit) is conducted from its chamber 44′ through pipe 16ª to the cooler K′ of same construction as the cooler K, Fig. 1, where it runs on to a horizontal partition 17ª and goes through the tubes 18ª. In the same manner and for the same purposes as already described regarding to Fig. 1, the cooler K′ is provided with partitions 19ª and connected with a final cooler 34ª. The cooled condensates (extra fine spirit) run through pipe 20ª into the measuring apparatus L′.

The vapors which leave the tubes 45′ of the condenser H' and which carry readily boiling vapors (aldehydes) with them, are conducted to the rectifying column M', where the more easily condensable portions of the vapors (extra fine spirit) for the most part remain behind, while the more difficultly condensable portions (aldehydes, first runnings) (still more or less mixed with spirit) pass through the pipe 21ª into the corresponding part of the cooler K' and then through the pipe 22ª into the aldehyde collector N'. As stated regarding to Fig. 1 the column M' may be dispensed with and the mixed aldehyde—spirit—vapors conducted directly into the cooler K' for debasing purposes.

In the chamber 44' of the condenser H' below the column M' a swing-pan 23ª, operated from the outside, is provided, whereby the mixed condensates which form from the commencement of the distillation in consequence of strong cooling, are discharged into the pipe 24ª, which conducts them back to the column F'. When the column M' is so far heated by the vapors that the difficultly condensable portions (aldehyde, first runnings) of the vapors cannot condense in the column, and only the readily condensable portion (extra fine spirit) flows down, the swing pan is inclined to the inner side of the condenser H' so that the condensates of the column M' may mix with the condensates of H' in the chamber 44' and flow through pipe 16ª to the cooler K'.

The dephlegmator G' is of same construction as the dephlegmator G (Fig. 1). 26ª is the pipe introducing the cooling liquid and 27ª is an air pipe.

The water leaving the cooler K' is conducted through the pipe 28ª into the condenser H' and C', the dephlegmator G', and so on.

Having now described my invention, what I claim is:

1. In an apparatus for distilling liquids and for fractional condensation and fractional rectification of the constituents of a vaporous mixture, which apparatus comprises distilling and rectifying columns and condensers, the combination with the distilling column of a condenser, a fusel-oil separator connected with the said condenser a low-wines cooler arranged between the said condenser and fusel-oil separator, a low-wines column connected with the fusel-oil separator, a low-wines heater arranged between the said low-wines column and separator, a rectifying column or columns provided with condensing portions, pipes for connecting the rectifying column or columns with the fusel-oil separator, a second condenser connected with the condensing portion of the rectifying column and having pure condensate pipes, a second rectifying column connected with the second condenser, a swing-pan and piping for receiving and conducting the impure condensates to the rectifier and for conducting the pure condensates to the second condenser, a tubular cooler comprising end partitions and tubes having perforated upper ends and being connected with a final cooler, one or more of said apparatus having partition-means to enable simultaneous treatment of two or more substances, and pipes connecting the said pieces of apparatus, substantially as described.

2. In an apparatus for distilling liquids and for fractional condensation and fractional rectification of the constituents of a vaporous mixture, the combination with the distilling column containing perforated partitions, having each a channel of semi-circular cross-section, and a semi-circular depending flange, of a condenser, a fusel-oil separator connected with the said condenser and having a partition extending downward nearly to the bottom, a low-wines cooler arranged between the said condenser and fusel-oil separator, a low-wines column connected with the fusel-oil separator, a low-wines heater arranged between the said low-wines column and separator, a rectifying column or columns provided with condensing portions, pipes for connecting the rectifying column or columns with the fusel-oil separator, a second condenser connected with the condensing portions of the rectifying column and having pure condensate pipes, a second rectifying column connected with the second condenser, a swing-pan and piping for receiving and conducting the impure condensates to the rectifier and for conducting the pure condensates to the second condenser, a tubular cooler comprising end partitions and tubes having perforated upper ends and being connected with a final cooler, the condensers being provided with small tubes inserted between two partitions and forming passages for the vapors, said tubes being surrounded by the cooling liquid, each condenser being further provided with a steam-inlet pipe and valve for heating the cooling liquid, and a valve regulating automatically the temperature of the cooling liquid, substantially as described.

In testimony, that I claim the foregoing as my invention, I have signed my name in presence of two subscribing witnesses.

VICTOR SLAVÍČEK.

Witnesses:
HANS PAPPENHEIM,
ALVESTO S. HOGUE.